United States Patent
Sheen et al.

(10) Patent No.: US 10,837,882 B2
(45) Date of Patent: Nov. 17, 2020

(54) BINARY CLEANUP DEVICE FOR FAST CLEANUP OF SOLVENT EXTRACTS AND SIMPLIFIED SAMPLE PRETREATMENT METHOD USING THE BINARY CLEANUP DEVICE

(71) Applicant: National Formosa University, Huwei Township (TW)

(72) Inventors: Jenn-Feng Sheen, Huwei Township (TW); Shuen-Rung Hsiao, Huwei Township (TW); Jhong-Yun Sie, Huwei Township (TW)

(73) Assignee: NATIONAL FORMOSA UNIVERSITY, Huwei Township (TW)

( * ) Notice: Subject to any disclaimer, the term of this patent is extended or adjusted under 35 U.S.C. 154(b) by 229 days.

(21) Appl. No.: 16/191,887

(22) Filed: Nov. 15, 2018

(65) Prior Publication Data
US 2019/0353567 A1 Nov. 21, 2019

(30) Foreign Application Priority Data
May 16, 2018 (TW) .............................. 107116636 A

(51) Int. Cl.
*G01N 1/34* (2006.01)
*B01D 35/02* (2006.01)
(Continued)

(52) U.S. Cl.
CPC .............. *G01N 1/34* (2013.01); *B01D 35/02* (2013.01); *B01L 3/021* (2013.01); *B01L 3/508* (2013.01);
(Continued)

(58) Field of Classification Search
CPC ........ G01N 1/34; G01N 1/286; G01N 1/4077; G01N 1/4055; G01N 2001/2866;
(Continued)

(56) References Cited

U.S. PATENT DOCUMENTS

| | | | |
|---|---|---|---|
| 9,581,579 B2 | 2/2017 | Lin et al. | |
| 2009/0294385 A1* | 12/2009 | Tajima | B01D 61/145 210/808 |

OTHER PUBLICATIONS

Anastassiades et al., Fast and easy multiresidue method employing acetonitrile extraction/partitioning and "dispersive solid-phase extraction" for the determination of pesticide residues in produce. Journal of AOAC International 2003, 86 (2), 412-31.
(Continued)

*Primary Examiner* — Jennifer Wecker
*Assistant Examiner* — Michael Paul Shimek
(74) *Attorney, Agent, or Firm* — Muncy, Geissler, Olds & Lowe, P.C.

(57) ABSTRACT

A binary cleanup device for sample pretreatment of compound analysis and a simplified sample pretreatment method using the binary cleanup device are disclosed. The simplified sample pretreatment method includes a homogenization step to crush the sample, an extraction/partition step to mix the crushed sample with a solvent and a salt reagent into a sample liquid, a filtration step to remove solid matters from the sample liquid, and a cleanup step to clean up the filtered sample liquid using a binary cleanup device, which is consisting of a liquid transfer device and a filter tube filled up with a cleanup agent. Draw a defined portion of the filtered sample extracts via the liquid transfer device, and then let the aspirated sample liquid pass through the cleanup agent of the filter tube. Thus, a single liquid transfer step that achieving accurate sampling and rapid cleanup, simultaneously.

6 Claims, 12 Drawing Sheets

(51) Int. Cl.
*B01L 3/00* (2006.01)
*B01L 3/02* (2006.01)
*G01N 1/28* (2006.01)
*G01N 1/40* (2006.01)

(52) U.S. Cl.
CPC ........... *G01N 1/286* (2013.01); *G01N 1/4055* (2013.01); *G01N 1/4077* (2013.01); *B01L 2300/0681* (2013.01); *B01L 2300/126* (2013.01); *G01N 2001/2866* (2013.01); *G01N 2001/4061* (2013.01); *G01N 2001/4088* (2013.01)

(58) Field of Classification Search
CPC ... G01N 2001/4061; G01N 2001/4088; B01D 35/02; B01L 3/508; B01L 3/021; B01L 2300/0681; B01L 2300/126; B01L 2200/0668; B01L 2200/0631; B01L 3/0275
See application file for complete search history.

(56) References Cited

OTHER PUBLICATIONS

Lehotay, S. J., Determination of Pesticide Residues in Foods by Acetonitrile Extraction and Partitioning Magnesium Sulfate: Collaborative Study. Journal of AOAC International 2007, 90 (2).

Food of plant origin—Determination of pesticide residues using GC-MS and/or LC-MS/MS following acetonitrile extraction/partitioning and clean-up by dispersive SPE-QuEChERS-method, the authority of the Standards Policy and Strategy Committee 2008, BS EN 15662.

Determination of Pesticides in Strawberries Using QuEChERS Extraction, Quick QuEChERS Clean-up and GC/MS Detection, UCT, 2012, DCN-217280-241.

Koesukwiwat et al., High throughput analysis of 150 pesticides in fruits and vegetables using QuEChERS and low-pressure gas chromatography-time-of-flight mass spectrometry. J. Chromatogr A, 2010, 1217(43), 6692-703.

* cited by examiner

BINARY CLEANUP DEVICE FOR FAST CLEANUP OF SOLVENT EXTRACTS AND SIMPLIFIED SAMPLE PRETREATMENT METHOD USING THE BINARY CLEANUP DEVICE

BACKGROUND OF THE INVENTION

1. Field of the Invention

The present invention relates to the technology of chemical analysis, and more particularly to a simplified cleanup device for the sample pretreatment which is usually required for the pesticide analysis in agriculture, food or other biological samples. An improved sample pretreatment method using the simplified device is also included.

2. Description of the Related Art

In order to monitor pesticide residues in agricultural products, various analytical methods are applied to detect the pesticide residue of agricultural products and commercial food staffs. For example, the colorimetric method has been used to detect pesticide residue of DDT, or the thin layer chromatography can be used to detect multiple residues, and the gas chromatography has been applied as an important detection method.

At present, the detection of pesticide residues in agricultural products or foods can be roughly divided into two types: the biochemical method and the chemical method. The biochemical method is based on enzyme reaction or antibody binding and it can be applied for quick screening for specific groups of pesticides using relatively simple equipment and processing steps. The chemical method is mainly based on instrumental analysis of mass spectrometry. The processed sample solution is frequently obtained by the QuEChERs method which includes high-speed homogenization, solvent extraction, partition/extraction, aliquot, cleanup, air-drying and re-dissolving steps (Anastassiades, M.; Lehotay, S. J.; Stajnbaher, D.; Schenck, F. J., Fast and easy multiresidue method employing acetonitrile extraction/partitioning and "dispersive solid-phase extraction" for the determination of pesticide residues in produce. *Journal of AOAC International* 2003, 86 (2), 412-31). The sample solution is then analyzed by gas or liquid chromatography mass spectrometry. Although the chemical method is expensive, complicate and time consuming, the results obtained by mass spectrometry are still wildly used as the basis for enforcement and management in many countries. This could be due to the advantages of being capable of specific detecting wild range of pesticide residues, lower detection limits, and accurate quantitative analyses.

At present, for the multi-residues analysis of pesticides, it is common to apply the QuEChERS sample pretreatment method first, followed by liquid chromatography tandem mass spectrometry (LC-MS/MS) and gas chromatography tandem mass spectrometry (GC-MS/MS), such as the AOAC 2007.01 and EN15662 official methods (Lehotay, S. J., Determination of Pesticide Residues in Foods by Acetonitrile Extraction and Partitioning with Magnesium Sulfate: Collaborative Study. *Journal of AOAC International* 2007, 90 (2), 485-520, CEN Standard Method EN 15662: Food of plant origing—determination of pesticide residues using GC-MS and/or LC-MS/MS following acetonitrile extraction/partitioning and clean-up by dispersive SPE—QuFChERS method, www.cen.eu).

The official method for detecting multiple pesticide residues proposed by the Taiwan Food and Drug Administration in 2017 is also carried out using the QuEChERS method described above and followed by the GC-MS/MS and LC-MS/MS analyses.

Although the aforementioned QuEChERS pretreatment method has been convenient, it still has to perform many steps such as extraction, partition, aliquot and cleanup. It takes considerable time, and several commercial devices were developed to further simplify the QuEChERS steps, such as the QuICk QuEChERS (Determination of Pesticides in Strawberries by QuEChERS Extraction, Quick QuEChERS Clean-up, and GC/MS Detection, U C T, 2012, DCN-217280-241), the DPX (Koesukwiwat, U.; Lehotay, S. J.; Miao, S.; Leepipatpiboon, N., High throughput analysis of 150 pesticides in fruits and vegetables using QuEChERS and low-pressure gas chromatography-time-of-flight mass spectrometry. J Chromatogr A, 2010, 1217(43), 6692-703) and U.S. Pat. No. 9,581,579B2. All the three devices deal with the cleanup steps in QuEChERS. After the partition, for QuICk QuEChERS, an aliquot of the upper extracts is transferred to the disposable syringe (without the piston) connected with a solid sorbent cartridge. The syringe piston is replaced and then pushes the extracts through the cartridge to do the cleanup. The DPX made as a tip with loosen-packed solid sorbent. It is adapted to a disposable syringe before using. After partition, part of the upper extracts was transferred into a test tube with pipette, the cleanup is then accomplished by aspirating and dispensing the extracts several times with the DXP tip and syringe (bottom loading). In U.S. Pat. No. 9,581,579B2, after solvent extraction, the partition step of QuEChERS is eliminated, the whole sample including plant materials is poured into the FaPex device which is made with a syringe packed with 2 layers of solid sorbents. The piston is then replaced and pushes the sample through the device. The upper and lower sorbent layers are proposed for dehydration and cleanup, respectively. In summary, the purpose of all the previous techniques are intended to simplify the steps of conventional QuEChERS, eliminate the need of vortex/centrifuge steps.

SUMMARY OF THE INVENTION

The present invention is accomplished under the circumstances in view. It is the main object of the present invention to provide a binary cleanup device for the sample pretreatment of compound analysis, which can simplify the QuEChERS steps by integrating the aliquot and cleanup steps into a single liquid transfer step.

It is another object of the present invention to provide a simplified and fast sample pretreatment method, which can facilitate the compounds analysis to be more quickly and easily.

To achieve these and other objects of the present invention, a binary cleanup device for sample pretreatment comprises a liquid transfer device and a filter tube. The liquid transfer device comprises a liquid transfer tube and is adapted for drawing a sample extracts and dispensing the sample extracts from the liquid transfer tube. The filter tube comprises a first orifice, an opposing second orifice, a liquid channel in communication between the first orifice and the second orifice, a cleanup agent filled in the liquid channel, and a filter element engaged between the cleanup agent and the second orifice. The filter tube is detachably attached onto the liquid transfer tube by the first orifice for enabling the sample liquid being removed from the liquid transfer tube to flow through the liquid channel, the cleanup agent and the filter element to the outside of the second orifice to seamlessly achieve accurate volumetric sampling (aliquot) and rapid cleanup. It has to be noted that only one solvent transfer step (1 aspiration/dispense cycle) is needed for accomplishing both aliquot and cleanup steps by using this invented device. No one previous binary cleanup device has mentioned that is capable for this purpose.

Furthermore, in this invention, the preferred use of the liquid transfer device is crucial for this mention to be a practical technique. This liquid transfer device is served not only for accurate aliquot but also for providing enough pressure to drive the solvent extracts throughout the filter tube. The more popular air displacement pipette tip may be used for aliquot but usually not provide enough pressure for cleanup. To eliminate the vortex and centrifuge steps in QuEChERS, the previous cleanup devices usually use the disposable syringe to give enough driving pressure, though the syringe is also a positive displacement device, it is not as convenient and accurate as the liquid transfer device for aliquot. Therefore, most often, a separate aliquot step is performed before the cleanup step.

To achieve these and other objects of the present invention, a simplified sample pretreatment method is developed which comprises the steps of (1) crushing a sample, (2) extraction/partition to mix the crushed sample with a solvent and a salt reagent added into the sample liquid, (3) filtration to remove solid matters from the sample liquid, and (4) aliquot/cleanup to clean up the filtered sample extracts using the binary cleanup device.

Other and further benefits, advantages and features of the present invention will be understood by reference to the following specification in conjunction with the accompanying drawings, in which like reference characters denote like elements of structure.

DETAILED DESCRIPTION OF THE INVENTION

First of all, the present invention can be widely applied to the detection of various compounds, such as residual pesticides for crops or residual drugs for animal samples. Those skilled in the art can understand that the description of the preferred embodiment and the claims include the generic concept of the specific technical manner, and is not limited to the description, and does not limit the application field, nor is it limited to the specific detection technical features.

Figure 1:
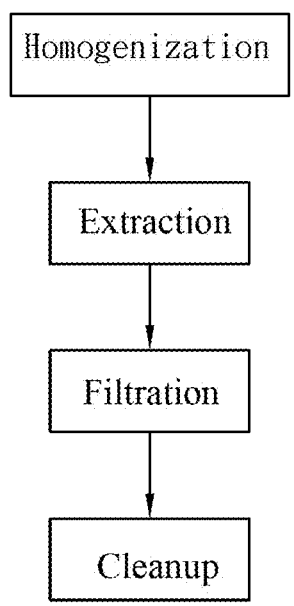
FIG. 1 is a flow chart of a simplified sample pretreatment method in accordance with the present invention.
Figure 2:
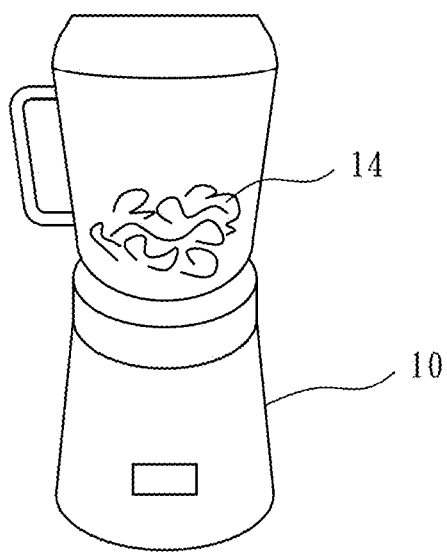
FIGS. 2-7 illustrate the implementation of the simplified sample pretreatment method in accordance with the present invention.

Referring to FIG. 1, a simplified sample pretreatment method for the detection of a compound in accordance with the present invention includes the steps of:

1. Homogenization: As illustrated in FIG. 2, crush the agricultural crops to be analyzed. The invention uses a household blender 10 to crush the agricultural crops to be analyzed into a homogenized and fine sample 14. The household blender 10 is not only convenient to obtain and use to increase the contact surface area of the sample, but also can be applied to different types and plant forms of agricultural crops, more importantly the cup/knife set can be replaced easily for each sample and the contamination between samples is prevented.

Figure 3:
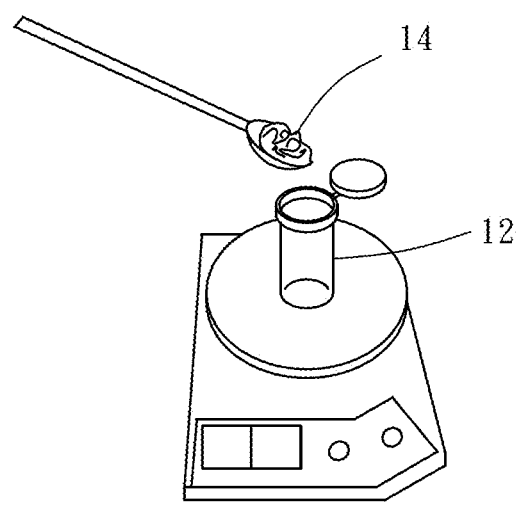
Figure 4:
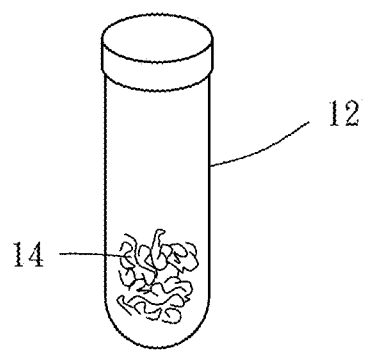

2. Extraction: As illustrated in FIG. 3 and FIG. 4, place 10 g sample 14 in a 50 ml centrifuge tube 12, and then mix the sample 14 with 10 ml acetonitrile solvent in the centrifuge tube 12, shake 30 seconds by hand, and then pour a salt reagent into the centrifuge tube 12, and then shake the centrifuge tube 12 directly by hand for about 30 seconds to allow a sample liquid to be produced between the sample 14 and the solvent.

Figure 5:
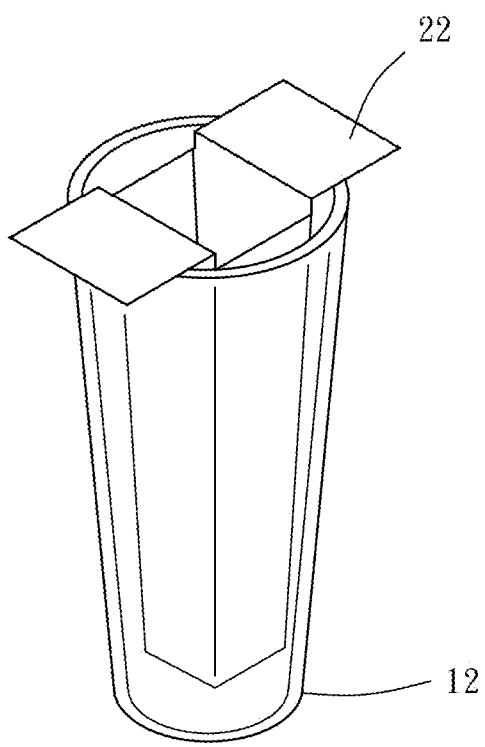

3. Filtration: As illustrated in FIG. 5, arrange a filter paper 22 into an elongated container, and then directly place the elongated container of filter paper 22 inside the centrifuge tube 12, enabling the sample extracts to be filtered through the filter paper 22 and to flow into the inner space of the filter paper 22 and the solid matter of the sample liquid to be isolated from the filter paper 22.

Figure 6:
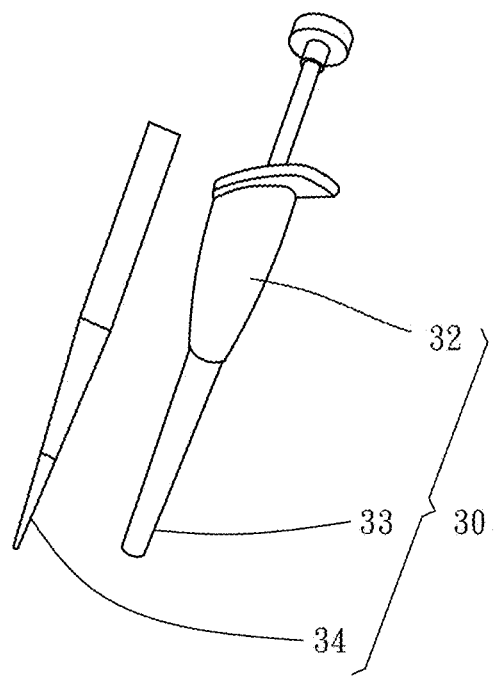
Figure 7:
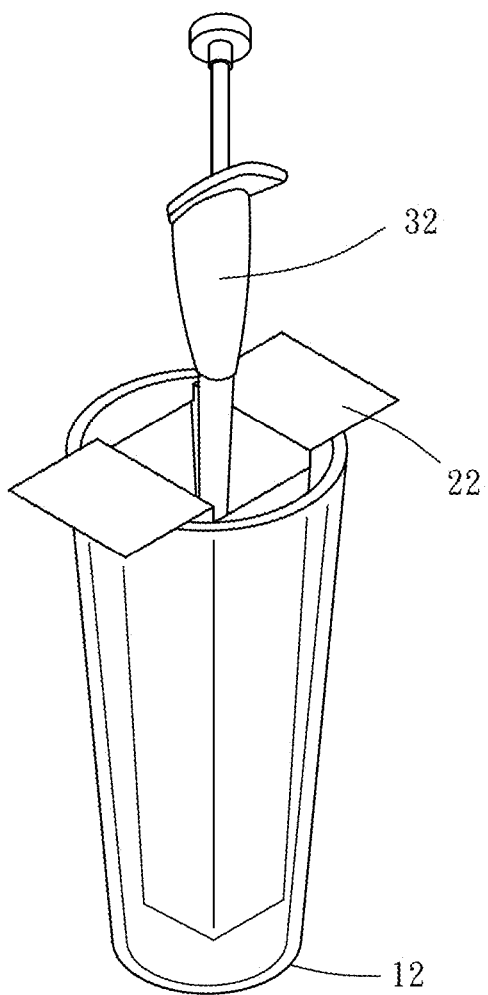

4. Cleanup: As illustrated in FIG. 6, use a binary cleanup device 30 to clean up the filtered sample extracts that is filtered through the filter paper 22. The binary cleanup device 30 comprises a liquid transfer tube 33 and a filter tube 34. In this embodiment, the liquid transfer tube 33 is a positive displacement tip and is operated via a liquid transfer device 32 which is a positive displacement pipette. Of course, other liquid transfer devices with accurate liquid aspiration can be selectively used. As illustrated in FIG. 7, use the liquid transfer tube 33 with positive displacement pipette 32 to draw a predetermined small volume of the filtered sample extracts, and then attach the filter tube 34 to the liquid transfer tube 33, and then operate the positive displacement pipette 32 to expel the filtered sample extracts out of the liquid transfer tube 33 and the filter tube 34, thereby obtaining a cleaned sample extracts.

Figure 8:
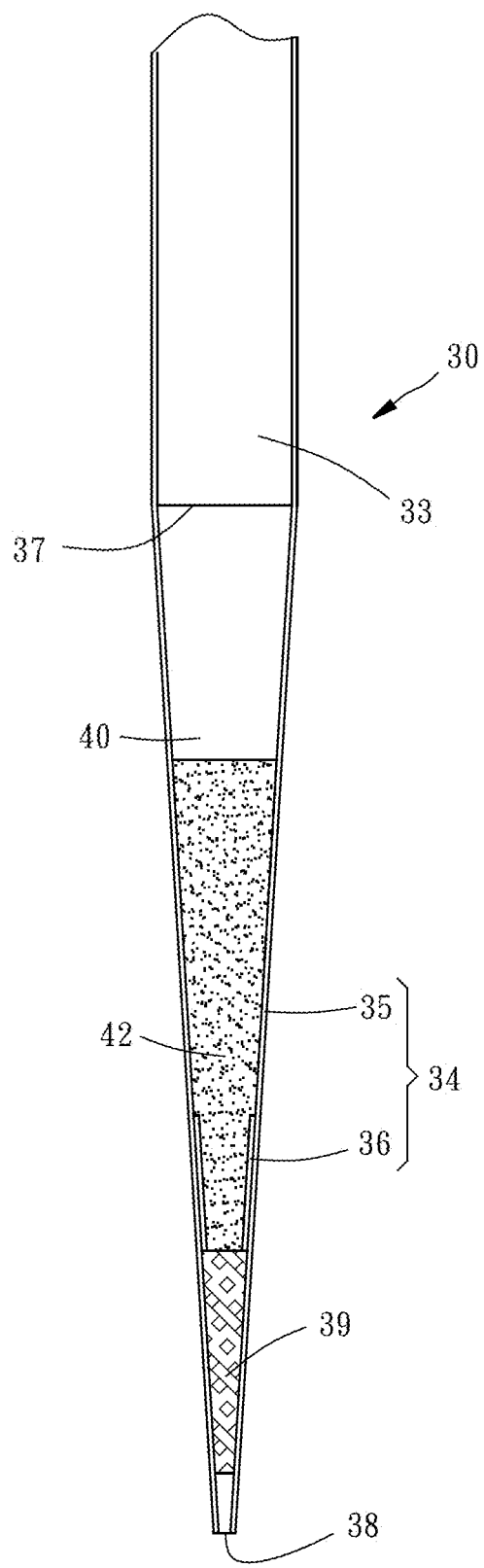
FIG. 8 is a sectional view of a filter tube for the binary cleanup device in accordance with the present invention.
Figures 10, 11:
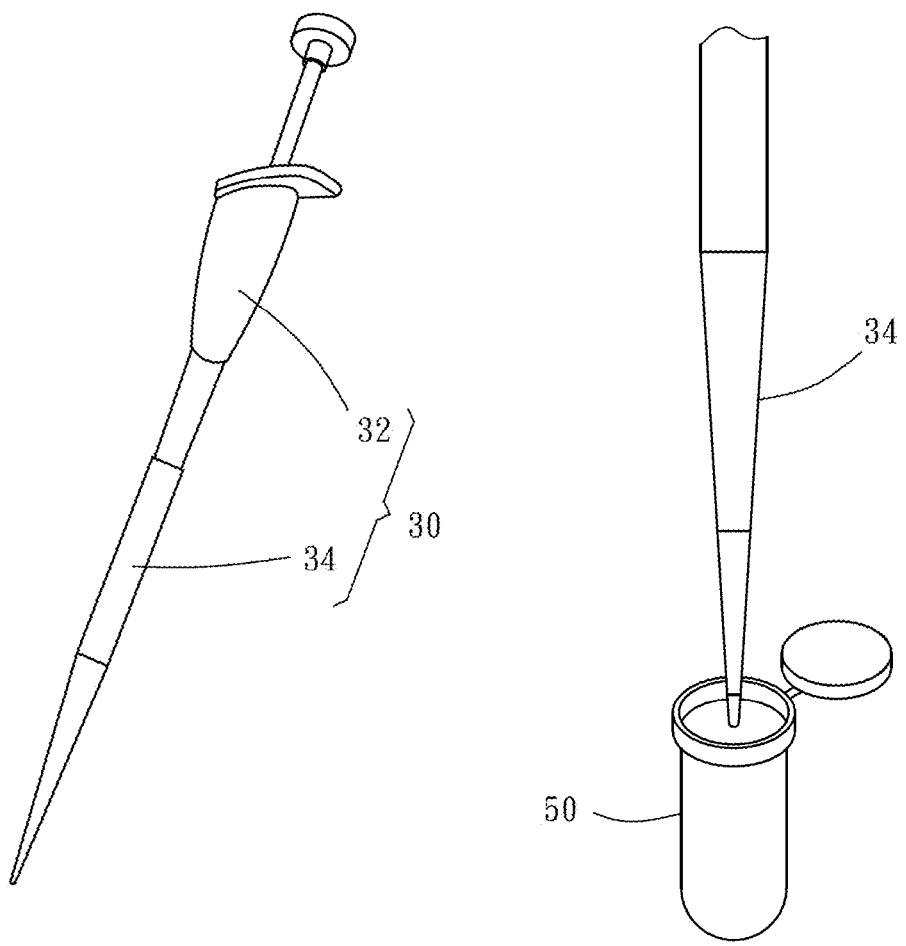
FIG. 10 is a schematic drawing illustrating the structure of the binary cleanup device in accordance with the present invention.
FIG. 11 is a schematic drawing illustrating a status of use of the simplified sample pretreatment method in accordance with the present invention.

Referring to FIG. 8, the filter tube 34 comprises a first orifice 37 and an opposing second orifice 38, a liquid channel 40 in communication between the first orifice 37 and the second orifice 38, and a filter element 39 engaged within the liquid channel 40 near the second orifice 38. The filter element 39 of the present preferred embodiment takes cotton as an example. The filter element 39 is confined to the inside of the filter tube 34 by an annular positioning member 36 disposed inside the liquid channel 40. The positioning member 36 in the present preferred embodiment is a small-sized tube member. A cleanup agent 42 is stuffed in the liquid channel 40 into the filter tube 34 above the filter element 39. As illustrated in FIG. 10, the filter tube 34 is detachably attached onto the liquid transfer tube 33 with a first orifice 37. As illustrated in FIG. 11, the filtered sample liquid that is expelled out of the liquid transfer tube 33 via the liquid transfer device 32 and is forced to flow through the liquid channel 40 and the cleanup agent 42 to a sample bottle 50 via the second orifice 38. When flowing through the cleanup agent 42, the filtered sample extracts is cleaned up, and the cleaned sample extracts obtained in the sample bottle 50 can be analyzed by subsequent mass spectrometry to detect the interested compounds in the cleaned sample extracts.

Figure 9:
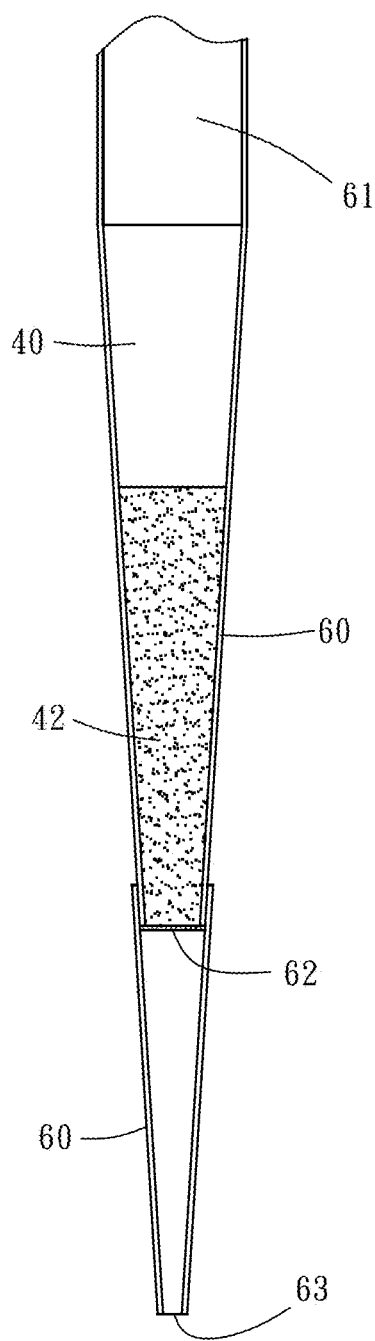
FIG. 9 is similar to FIG. 8, showing an alternate form of the filter tube.
Figure 12:
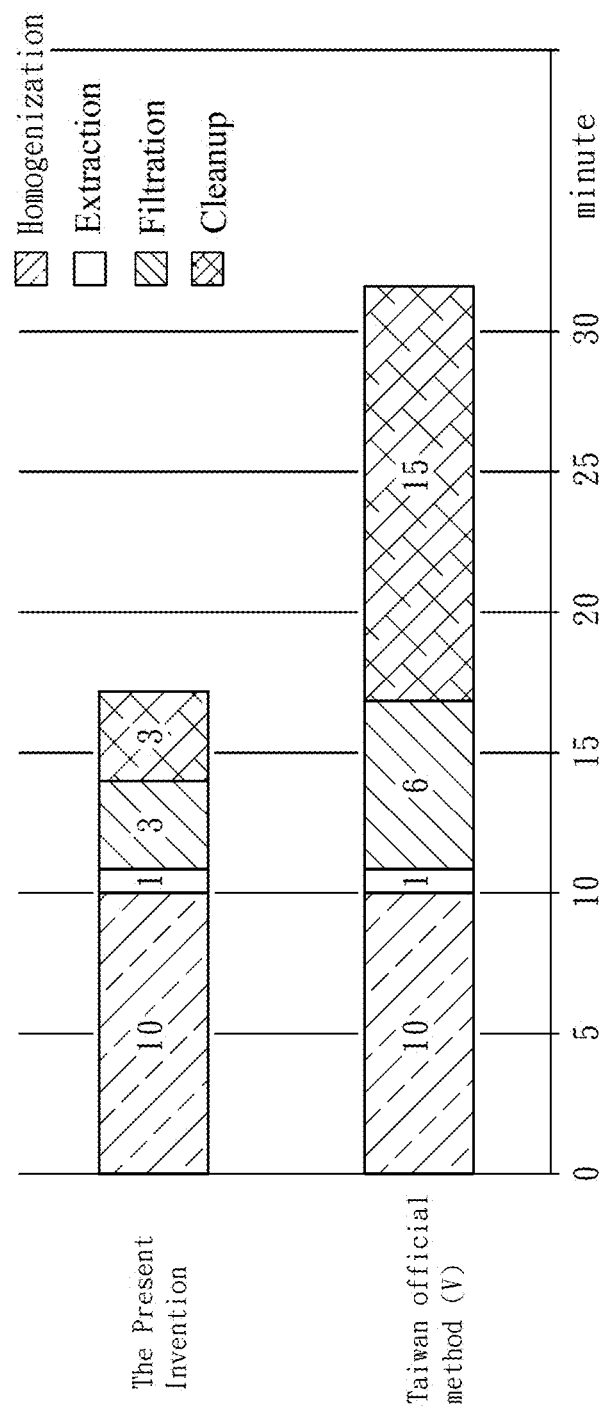
FIG. 12 is a time comparison diagram of the preferred embodiment of the present invention.

Referring to FIG. 9, in an alternate form of the present invention, the filter tube is composed of two tubes 60 connected in series. In this alternate form, the first orifice 61 is defined in the top end of the top-sided tube 60; the second orifice 63 is defined in the bottom end of the bottom-sided tube 60; the liquid channel 40 is defined in between the two tubs 60; the filter element 62 is engaged within the liquid channel 40 between the first orifice 61 and the second orifice 63; the cleanup agent 42 is filled in the liquid channel 40 between the first orifice 61 and the filter element 62. With the above binary cleanup device and simplified sample pretreatment method, the present invention achieves the following technical effects 1. Since the filter tube of the binary cleanup device can be detachably used with the liquid transfer tube of the positive displacement pipette, the single liquid transfer process of the positive displacement pipette can complete the aliquot and cleanup steps simultaneously, without the need of conventional vortex and centrifugation procedures, eliminating the corresponding equipment and saving the processing time. When compared to Taiwan official method (V) for multi-class pesticides residue analysis as shown in FIG. 12, the invention saves the total pretreatment time by about 47%, i.e., the pretreatment time is reduced from 32 minutes to 17 minutes.

2. The cleanup agent inside the filter tube is adjusted according to the characteristics of the test samples, and it is not necessary to change the type of the filter tube, which is conducive to the development of a standard and uniform rapid screening test.

3. The invention processes the samples by using a lightweight household blender, as a substitute to the conventional high-power one. It can simplify the preparation processes and be suitable for fast screening purpose. It also can facilitate the on-site analysis in various sites.

4. The filtration process only requires the specially-made filter paper, which reduces the need of the shaking and centrifugation steps and obtain a transparent sample extracts similar to the conventional method.

Figure 13:
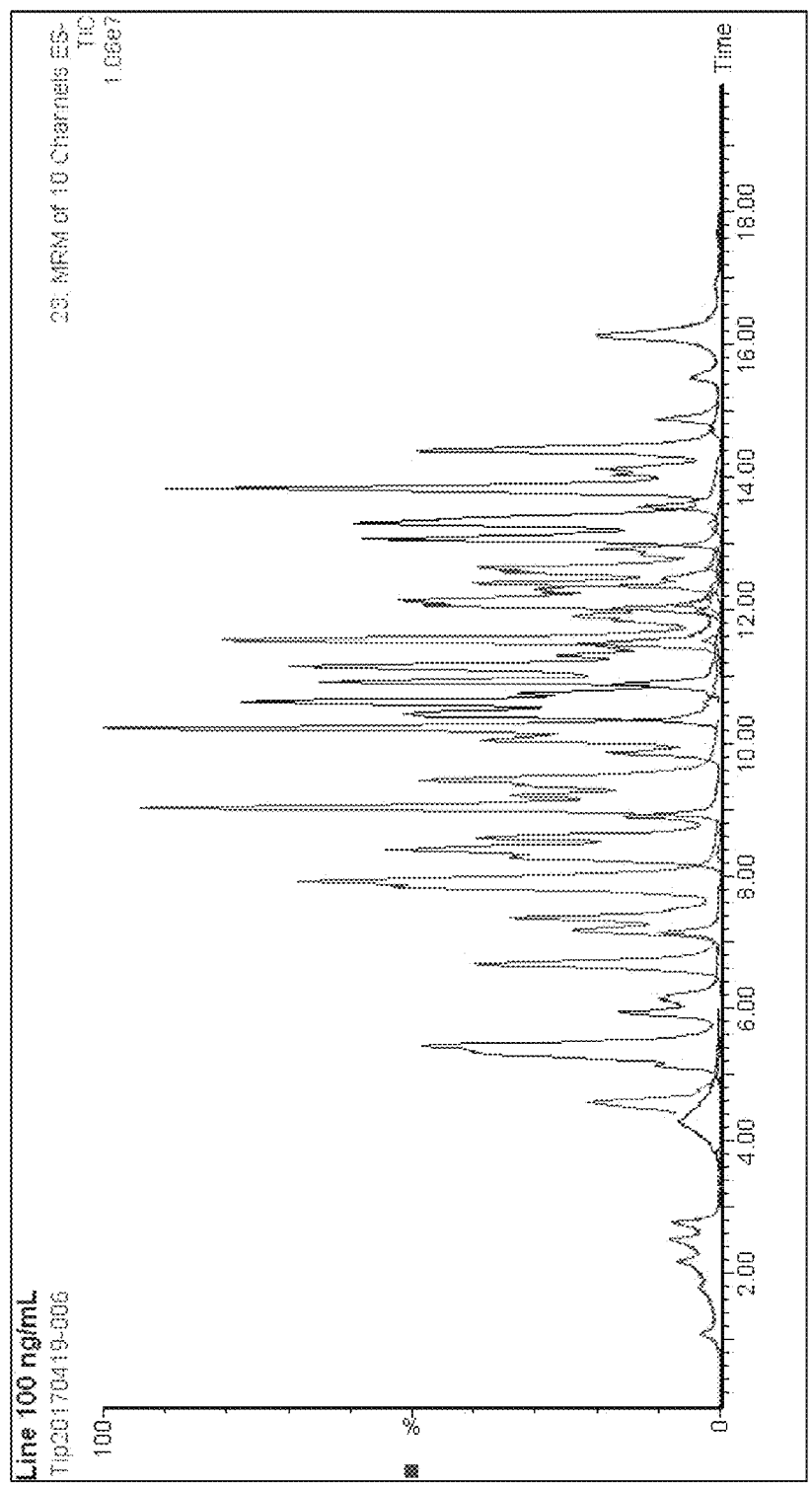
FIG. 13 is a diagram showing the total ion chromatogram of the preferred embodiment of the present invention.
Figure 14:
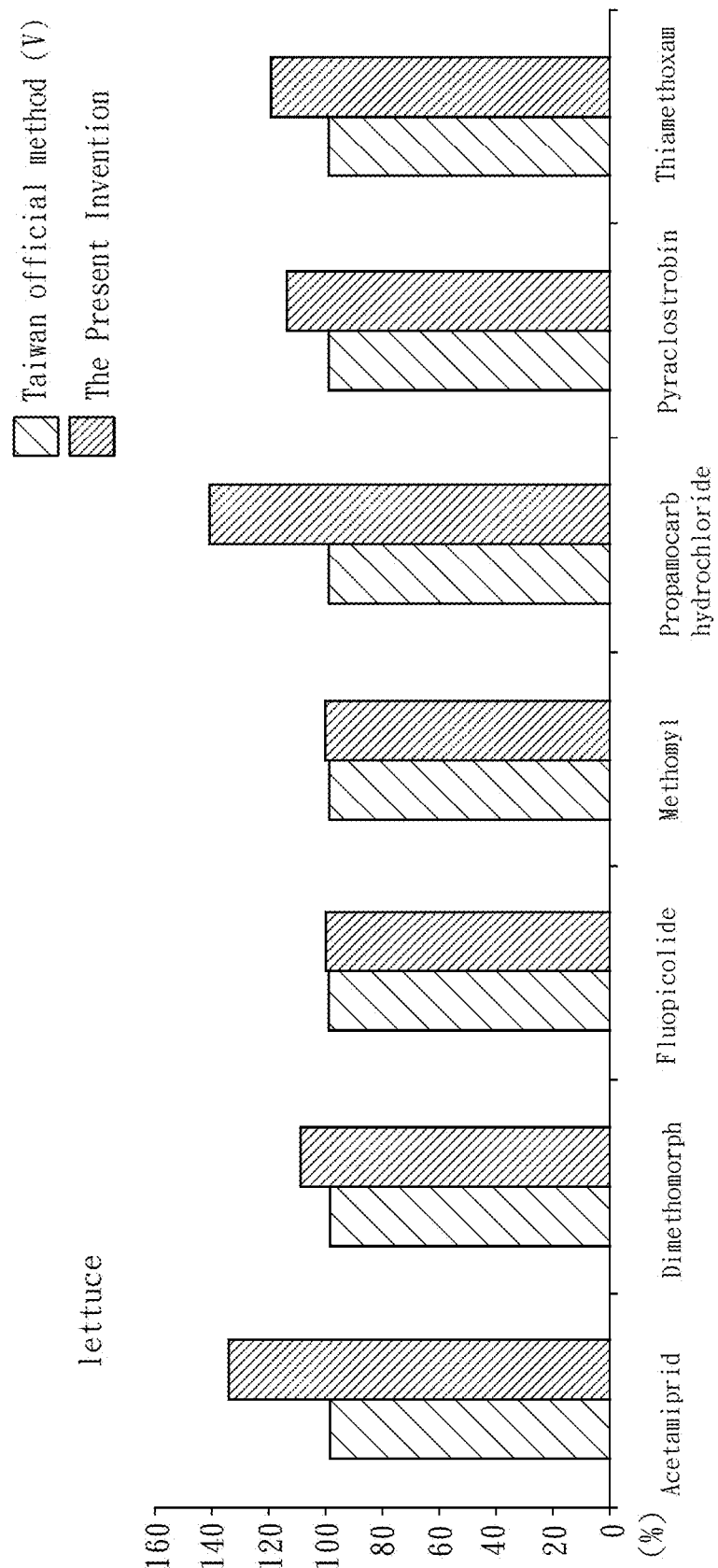
FIG. 14 and FIG. 15 are diagrams showing the results of detections on different test samples between the present invention and the prior art technique.
Figure 15:
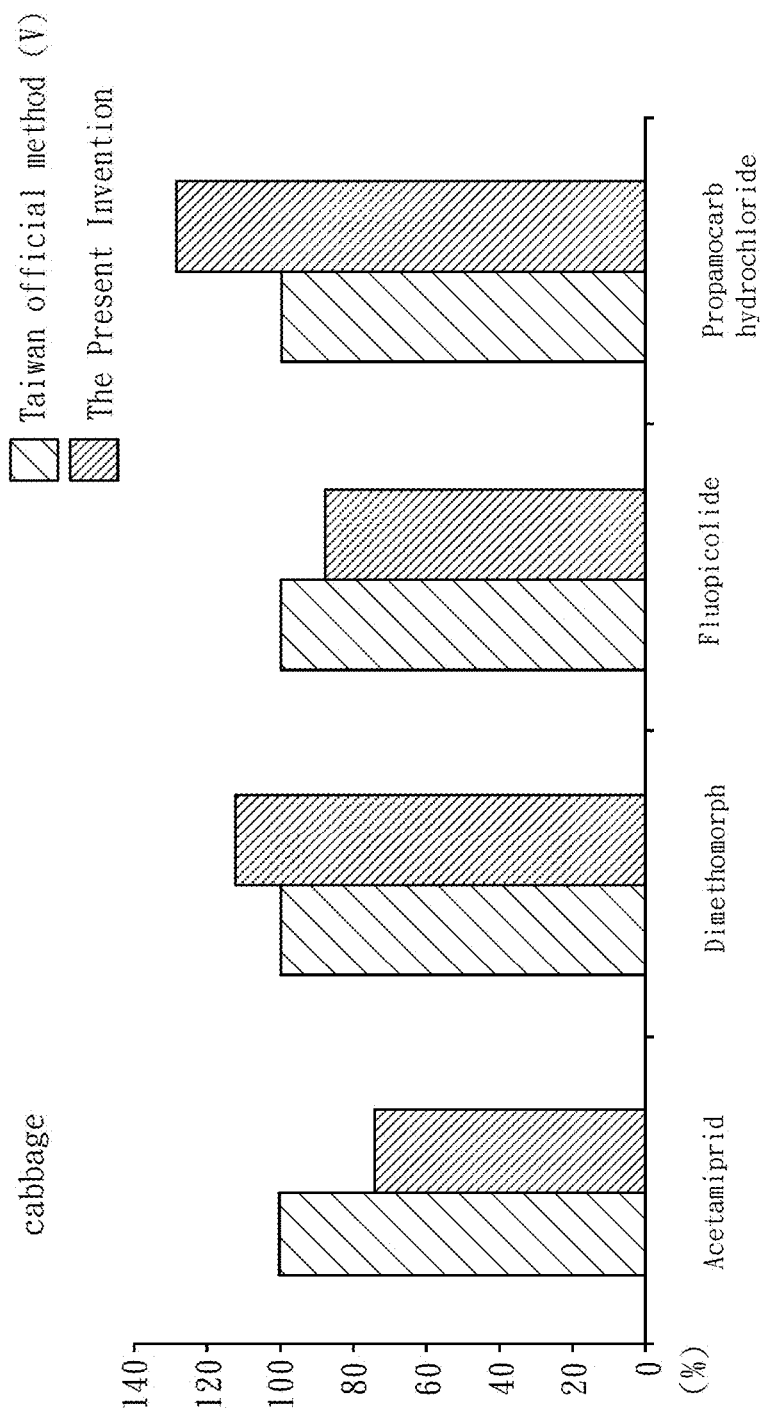

5. With the foregoing technical features, the prepared sample solution obtained by the present invention can be combined with a subsequent liquid chromatography mass spectrometer to construct a rapid screening method. As illustrated in FIG. 13, the present invention can be used to test 164 pesticides. FIG. 14 and FIG. 15 are comparison diagrams showing the results of the detected pesticides in lettuce and cabbage samples between the present invention and Taiwan official method (V) using a liquid chromatography mass spectrometer. The pesticide items detected by the method of the present invention are consistent with Taiwan official method (V), and the determined residual amounts are comparable. There was no false negative result for the detected pesticides items.

What is claimed is:

1. A binary cleanup device for compound sample pretreatment, comprising:
   a liquid transfer device comprising a liquid transfer tube, said liquid transfer device being adapted to draw a sample liquid and to remove said sample liquid from said liquid transfer tube; and
   a filter tube comprising a first orifice, an opposing second orifice, a liquid channel in communication between said first orifice and said second orifice, a cleanup agent filled in said liquid channel and a filter element engaged between said cleanup agent and said second orifice, said filter tube being detachably attached onto said liquid transfer tube of said liquid transfer device by said first orifice for enabling said sample liquid being removed from said liquid transfer tube to flow through said liquid channel, said cleanup agent and said filter element to the outside of said second orifice.

2. The binary cleanup device for compound sample pretreatment as claimed in claim 1, wherein said filter tube further comprises a positioning member engaged in said liquid channel to secure said filter element in place.

3. The binary cleanup device for compound sample pretreatment as claimed in claim 1, wherein said filter tube comprises a top-sided tube and a bottom-sided tube connected in series; said first orifice is defined in a top end of said top-sided tube; said second orifice is defined in a bottom end of said bottom-sided tube; said liquid channel is defined in between said top-sided tube and said bottom-sided tub; said filter element is engaged within said liquid channel between said first orifice and said second orifice; said cleanup agent is filled in said liquid channel between said first orifice and said filter element.

4. The binary cleanup device for compound sample pretreatment as claimed in claim 1, wherein said liquid transfer tube is a positive displacement tip and is operated via said liquid transfer device which is a positive displacement pipette.

5. A sample pretreatment method, comprising the steps of:
   a. crushing a sample;
   b. extraction to mix the crushed said sample with a solvent and a salt reagent added into a sample liquid;
   c. filtration to remove solid matters from said sample liquid; and
   d. cleanup to clean up the filtered said sample liquid using the binary cleanup device as claimed in claim 1.

6. The sample pretreatment method as claimed in claim 5, wherein said step c is accomplished by using a filter paper to remove solid matters from said sample liquid.

* * * * *